United States Patent Office 2,867,472
Patented Jan. 6, 1959

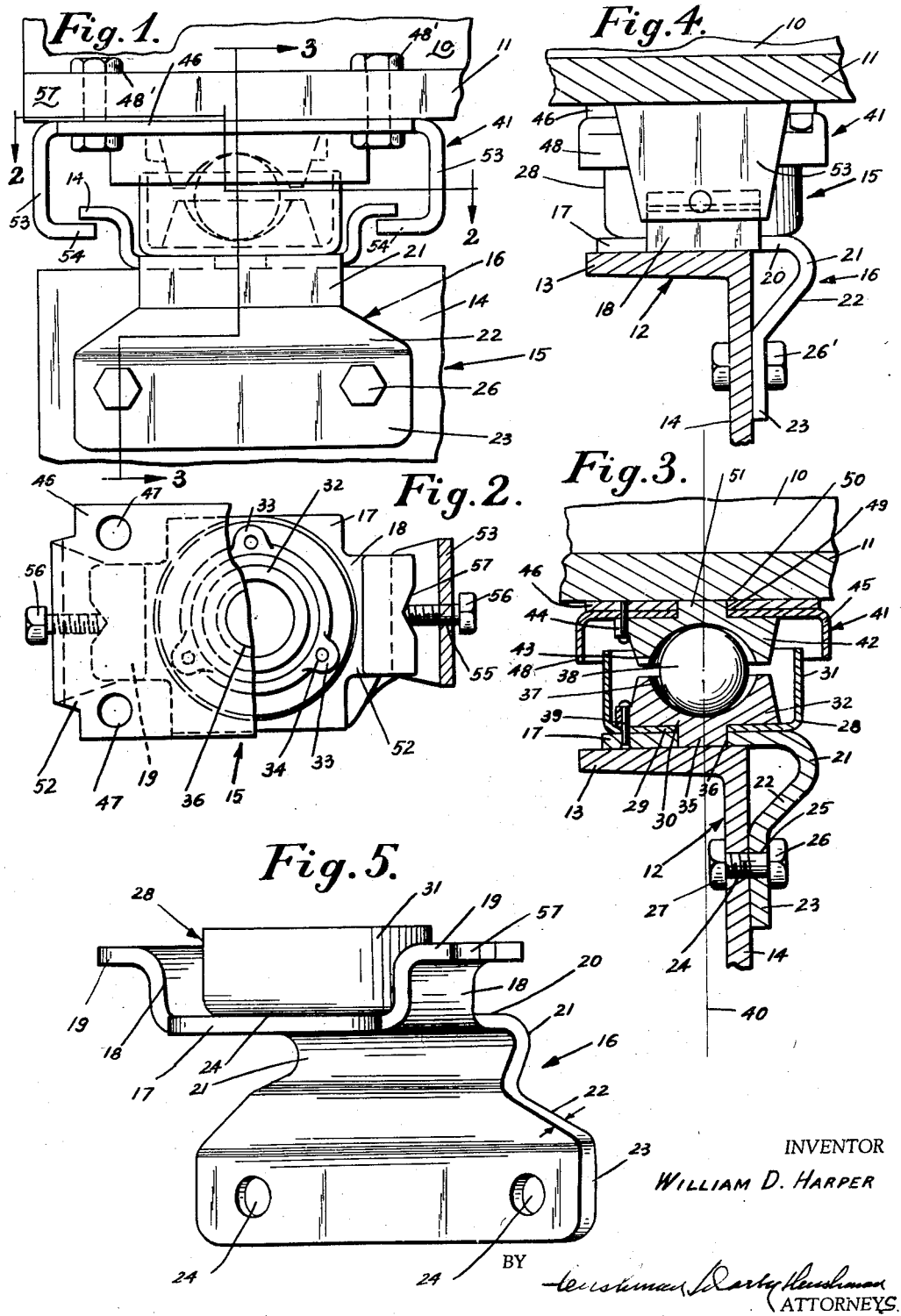

2,867,472

VEHICLE BODY SUPPORT FOR ABSORBING HORIZONTAL COMPONENT OF LOADS

William D. Harper, Wellesley Hills, Mass.

Application July 22, 1958, Serial No. 750,127

2 Claims. (Cl. 296—35)

The present invention relates to supports for vehicles, particularly bodies of heavy vehicles, such as motor trucks and the like, and is directed to an improvement over the vehicle body support embodied in my Patent No. 2,355,528, dated August 8, 1944.

Supports of this character are designed to be mounted on the side members of a chassis frame so as to carry the body of the vehicle. Thus, it will be seen that these supports transmit to the chassis the entire gravitational force of the body and its load or contents. These supports are mounted on angulated side members of the chassis frame preferably made of steel and having horizontal parallel arms and depending vertical arms. The supports are longitudinally spaced along the channel members so as to rest on the horizontal arms. Thus, it will be seen that the horizontal arms have to sustain the weight and pressure of the body when the latter is loaded to its full capacity. If this load is extremely heavy, it might cause the horizontal arms of the side members to be bent inwardly or sag, thus seriously affecting the efficient operation of the support assembly. Each of these supports includes a ball through which the gravitational thrust is transmitted to the chassis. Since the line of thrust is vertically downward through the center of the ball, it is desired that such line of trust be as near as possible to the plane of the vertical arm or web of the chassis frame on which the support is mounted, so as to eliminate the danger of the side members being weak and defective.

Accordingly, an important object of the invention consists in providing simple, efficient and economical means for positioning each support and the ball associated therewith, nearly over the vertical arm or web of the angulated chassis frame, so as to provide means for practically eliminating the tendency of the horizontal arm of the chassis frame to bend downwardly when subjected to heavy and excessive loads.

A further object consists in forming each support with a lower angulated member or bracket and an upper flat member or bracket spaced from the lower member. The upper member or bracket has a horizontal polygonal-shaped portion, the opposite ends of which are reduced and are bent downwardly to form depending flanges, and the horizontal portion of the upper member between the flanges is provided with openings for receiving suitable fastening means, such as bolts or the like, for detachably connecting the upper member to the underside of the body.

In supporting truck bodies intended to hold heavy cargoes, several support units are mounted on each side frame member of the chassis to share the load. For proper distribution of the load it is desirable that the vertical lines of thrust of each of the rearmost supports be as close to the rear end of the chassis as possible. In the improved support, the position and configuration of the upper member relative to the lower member provides means whereby the ball through which the thrust line extends can be located considerably nearer to the end of the chassis than has been possible with earlier forms of supports.

Other objects and advantages of the invention will become apparent from the following description when taken in conjunction with the accompanying claims and drawings.

Referring to the drawing, in which there is shown a preferred embodiment of the invention:

Fig. 1 is a detailed side elevational view of the improved supporting assembly constructed in accordance with the present invention and mounted between a side member of the chassis and the body of a vehicle, with fragments of the side member and the body being shown for purposes of illustration;

Fig. 2 is a sectional view taken substantially along the line 2—2 of Fig. 1;

Fig. 3 is a sectional view taken substantially along the line 3—3 of Fig. 1;

Fig. 4 is an end elevation of the support, as shown in Fig. 1; and

Fig. 5 is an enlarged detail perspective view of the lower member or bracket of the support assembly.

Referring to the drawing, 10 indicates the body of a vehicle, such as a truck or the like, and 11 a side member or beam connected to the body (Fig. 1). Below the body and spaced therefrom so as to be in substantially vertical alignment with each side member 11, is an angulated chassis frame 12 (Fig. 4) which has a horizontal arm or portion 13 and a depending vertical arm 14. Each support assembly is designated by the numeral 15 and is arranged to be disposed longitudinally and in spaced relation along the chassis frame and between the angulated member 12 and the body 10 of the vehicle. Each of the support assemblies 15 includes a lower member or bracket 16 made of metal, such as steel, and is formed with a polygonal-shaped horizontal flat portion 17 shown of substantially square shape (Fig. 5) that rests on the top of the horizontal arm 13 of the angulated member 12 and which is provided with reduced upwardly extending end portions 18 that terminate in laterally projecting flanges 19 which extend outwardly in opposite directions (Fig. 5). The horizontal portion 17 has on one side, a projection 20 extending beyond the vertical arm 14 of the angulated member 12 (Fig. 4). The extension 20 is bent or curved downwardly, as at 21, and is connected to an intermediate downwardly inclined portion 22, which terminates in a vertical depending end portion 23 that contacts with the arm 14 of the member 12 and is provided with spaced openings 24 (Fig. 5), which register with corresponding openings 25 in the arms 14 (Fig. 3), so as to receive a threaded bolt 26 to which is connected a retaining nut 27 for firmly securing the lower member 16 in a fixed position. The intermediate inclined portion 22 of the lower member 16 widens downwardly (Fig. 1) so that the vertical arm 23 is considerably wider than the horizontal arm 17 of the bracket 16 in order to impart the desired strength and rigidity to the lower member 16.

A cylindrical lubricating cup 28 has a bottom 29 provided with a central opening 30 (Fig. 3) and is also provided with an upwardly extending annular flange 31. The bottom 29 rests on the horizontal arm 17 of the lower member 16. Within the lubricating cup 28 is mounted a lower ball cup or bearing member 32 which is of circular shape and is provided with circumferentially spaced lugs 33 having openings 34 therein (Fig. 2). The bottom of the bearing cup 32 has a centrally depending tapered boss 35 which extends through the circular opening 30 which aligns with an opening 36 in the arm 17, so that the tapered boss 26 may be forced through these openings and be securely maintained in a fixed position within the cup 28. The upper surface of the ball cup 32 has a concave surface or socket 37 for loosely receiving a ball 38 of smaller diameter or curvature. Fastening means, such as rivets 39 (Fig. 3), extend upwardly through openings in the horizontal arm 17 of the lower member 16 and the bottom of the lubricating cup 28 and through the openings 34 in the lugs 33 for permanently securing the members 31 and 32 to the lower member 16. It will be seen that by providing the lower member 16 with the reversely curved projection or bulge 21, means are provided for locating the ball or sphere 38 almost directly over the vertical arm 14 of the chassis member and in overlapping relation to at least a portion thereof. The nearness of the ball 38 to the vertical arm 14 is clearly indicated by the line 40 which extends vertically through the diameter of the ball 38 (Fig. 3). The importance of this feature will be appreciated when it is considered that in supports of this character, the balls 20 are called upon to carry the entire weight of the vehicle body 10 and its load, with the result that the thrust of this weight is through the vertical diameter of the balls 38. Consequently, the closer these balls are positioned to the vertical arm 14 of the chassis frame, the stronger will be the support, and less will be the danger of the horizontal arm 29 being bent downwardly when subjected to excessive load pressure, since this load will now be transferred directly to the vertical arm 14 of the side member 12.

Associated with the lower member or bracket 16 is an upper member or bracket 41, which includes an inverted upper ball cup or bearing member 42 having a lower concave surface or recess 43 which confronts the curved recess 39 and is of substantially the same shape so as to co-act therewith for serving as a housing for the ball 38 when the parts are assembled. The cup member 42 is substantially similar in shape to the cup member 32 and has spaced circumferentially disposed lugs 44 provided with openings for connecting the same to an annular outer cap or shield 45 and an upper flat plate 46 (Fig. 3). The plate 46 may be of substantially rectangular shape and is provided adjacent its ends with openings 47 through which extend the bolts 48' for securing the upper member or bracket 41 to the underside of the member 11 of the body 10 (Fig. 1). The cap or shield 45 has a depending annular flange or skirt 48 spaced outwardly from the member 31 and is also formed with a circular opening 49 which registers with an opening 50 in the member 46 so as to receive the tapered lug 51 that projects upwardly and outwardly from the member 42 so as to securely connect these parts together by a wedging action.

The upper plate 46 has reduced end portions 52 (Fig. 2) which are bent downwardly, as at 53, and then inwardly to form the confronting end flanges 54 of such length as to overlap the flanges 19 on the lower member 16 (Fig. 1). It will be noted that the bolts 48' extend through the plate 46 and between the depending portions 53 rather than through ears which project outwardly from depending flanges, as shown in my said Patent No. 2,355,528. By reason of the location of the retaining bolts 48' between the portions 53, means are provided whereby the end support assemblies 15 can be mounted near or very close to the end 54 of the vehicle body 10 (Fig. 1), so that these supports are positioned for insuring the optimum distribution of the load. Additionally, the lower supporting member 16 and its associated upper supporting member 41 co-act with the ball 38 of each support assembly, so as to insure the location of each ball 38 being positioned almost directly over the vertical arm 14 of the side member, in order that substantially the entire weight of the vehicle body and its load, as well as the gravitational thrust of this weight, is transmitted directly through the vertical diameter of each ball 38 onto the vertical arm 14 of the chassis member so as to relieve the horizontal arm 13 thereof, being subjected to such a heavy strain or downward pressure as to cause the same to bend or sag and thus impair the otherwise efficient operation of the supporting member and its associated parts.

The upper and lower members 16 and 41 respectively, are maintained assembled by the overlapping of the flanges 19 with the flanges 54 and can readily be disassembled prior to the connection of the bolts 48 with the underside of the body 10, by the simple expedient, of turning the upper member 41 relative to the lower member 16 a sufficient distance, to clear the flanges 19 and 54. When initially installing each support assembly, rotation of the lower member 16 may be prevented by providing each of the depending portions 53 of the plate 46 with transversely aligned threaded openings 55 for receiving the threaded bolts 56 (Fig. 2), each of which is arranged to engage a centrally disposed notch 57 in the outer edge of the adjacent horizontal flange 19 (Fig. 2). When the support has been installed between the vehicle body 10 and the chassis frame 12, the bolts 56 are removed and the parts are in their operative position. It will be noted that the flanges 19 and 54 are normally spaced from each other so as to permit a limited amount of horizontal displacement or play between the body 10 of the vehicle and the chassis frame 12 which is sufficient to result in a marked reduction in tire wear and deterioration of the vehicle body as it is subjected to shocks and vibrations which otherwise would be transmitted undiminished from the chassis to the body.

Thus, it will be seen that the connection of the horizontal arm 17 of the lower member 16 with the vertical arm 23 by the curved projection 21 and its location relative to the side member 12 of the chassis frame, provides means whereby the line of thrust of the load from the vehicle 10 to the chassis is located as near as possible to the plane of the vertical arm 14 on which the support is mounted, so that the tendency to displace or bend the horizontal arm 13 of the chassis frame downwardly is practically eliminated or substantially reduced. Thus, ample space or clearance is provided for inserting the bolts 48' in place so that the upper member 41 may be detachably connected to the underside of the body by any suitable tool, such as a wrench or the like, or may be readily detachably connected so that the upper member may be removed upon turning of the same from its loose connection with the lower member 16.

Additionally, the upper rectangular flat plate 46 has the bolt receiving opening 47 positioned between the reduced depending end portions 52 so that the openings 47 project beyond the ends 19 of the lower member in order that the bolts 48 may be readily inserted into the openings 47 so as to connect the upper member 41 to the underside of the body 10. In other words, the openings 47 are readily accessible so that the bolts 48 may be either connected or disconnected from the support assembly.

It will be understood that the form of the invention shown is merely illustrative of a preferred embodiment and that such changes may be made without departing from the spirit of the invention, as fall within the scope of the following claims.

I claim:

1. In combination with a vehicle body having a side member provided with a horizontal arm and a depending vertical arm, a support between said body and said member, said support including a horizontal portion resting on the horizontal arm of a side member, said horizontal portion having one side thereof projected beyond said vertical arm and curved downwardly and inwardly toward the side member so as to provide a curved portion spaced from the vertical arm, said curved portion being connected to an inwardly inclined portion which terminates in a vertical end portion engageable with the adjacent vertical side of said side member, means for securing said vertical end portion to said side member, said horizontal portion having upwardly projected ends terminating in outwardly and laterally disposed flanges extending in opposite directions, a lubricating cup mounted on said horizontal portion, a lower ball cup within said lubricating cup, means connecting said ball cup to said lubricating cup and the longitudinal portion of said lower member, said ball cup having a concave recess in the upper surface thereof, a ball loosely mounted in said recess, said upper plate member having reduced depending end portions terminating in inwardly disposed lateral confronting flanges arranged to be positioned beneath and be overlapped by the flanges on said horizontal portion of the lower member, an inverted annular cup-shaped shield connected to the underside of said plate and spaced inwardly therefrom, an inverted upper ball cup member within said shield, means connecting said inverted cup member and said shield to the underside of said upper plate, said upper cup member having a concave inner surface confronting the concave surface of said lower cup member and engageable with said ball, said plate member having openings adjacent the corners thereof and projecting outwardly beyond the adjacent flanges of the horizontal portion of the lower member, fastening means extending through said openings for connecting said upper plate member to the underside of said body, said openings and said fastening means being positioned between said depending flanges so that the support adjacent the rear end of the body may be positioned as close as possible to said rear end in order to insure optimum distribution of the load, said openings being disposed outside of the adjacent sides of the horizontal plate portion of the lower member so as to be readily accessible for receiving the fastening means or for withdrawing the same from said plate member, and the curved portion of said lower member providing means whereby the ball of each support is located nearly over said vertical arm in order to absorb the gravitational thrust of the weight of the body and thus relieve any tendency of the horizontal arm of the side member to be forced downwardly when the vehicle body is subjected to an excessive load.

2. In combination with a vehicle body having spaced angulated side members, each of said side members having a horizontal arm and a depending vertical arm, body supporting assemblies between said body and said side members, each of said body assemblies including a lower angulated member and an upper plate member, said angulated member having a horizontal portion resting on the horizontal arm of a side member, said horizontal portion having one side thereof projected beyond said vertical arm and curved downwardly and inwardly toward the side member so as to provide a curved portion spaced from the vertical arm, said curved portion being connected to an inwardly inclined portion which terminates in a vertical end portion engageable with the adjacent vertical side of said side member, means for securing said vertical end portion to said side member, said horizontal portion having upwardly projected ends terminating in outwardly and laterally disposed flanges extending in opposite directions, said vertical end portion being of greater width than said horizontal portion, a lubricating cup mounted on said horizontal portion, a lower ball cup within said lubricating cup, means connecting said ball cup to said lubricating cup and the longitudinal portion of said lower member, said ball cup having a concave recess in the upper surface thereof, a ball loosely mounted in said recess, said upper plate member being of greater length and width than the horizontal portion of the lower member, said upper plate member having reduced depending end portions terminating in inwardly disposed lateral confronting flanges arranged to be positioned beneath and be overlapped by the flanges on said horizontal portion of the lower member, an inverted annular cup-shaped shield connected to the underside of said plate and embracing said lubricating cup member and circumferentially spaced therefrom, an inverted upper ball cup member within said shield, means connecting said inverted cup member and said shield to the underside of said upper plate, said upper cup member having a concave inner surface confronting the concave surface of said lower cup member and engageable with said ball, said plate member having openings adjacent the corners thereof and projecting outwardly beyond the adjacent flanges of the horizontal portion of the lower member, fastening means extending through said openings for connecting said upper plate member to the underside of said body, said openings and said fastening means being positioned between said depending flanges so that the support assemblies adjacent the rear end of the body may be positioned as close as possible to said rear end in order to insure optimum distribution of the load, said openings being disposed outside of the adjacent sides of the horizontal flange portions of the lower member so as to be readily accessible for receiving the fastening means or for withdrawing the same from said plate member, and the curved portion on said lower member providing means whereby the ball of each assembly is located nearly over the vertical arm of the adjacent side member in order to absorb the gravitational thrust of the weight of the body and thus relieve any tendency of the horizontal portion of the side member to be forced downwardly when the body is subjected to an excessive load.

References Cited in the file of this patent

UNITED STATES PATENTS 2,355,528    Harper _____ Aug. 8, 1944